Feb. 27, 1923.

W. W. McDOWELL 1,446,979

DIRIGIBLE HEADLIGHT CONSTRUCTION

Filed Aug. 10, 1922

Inventor
W. W. McDowell

Witnesses:
F. L. Fox
N. Berman

By Clarence A. O'Brien
Attorney

Feb. 27, 1923.

W. W. McDOWELL 1,446,979

DIRIGIBLE HEADLIGHT CONSTRUCTION

Filed Aug. 10, 1922

Witnesses:
J. L. Fox
N. Berman

Inventor
W. W. McDowell

By Clarence A. O'Brien
Attorney

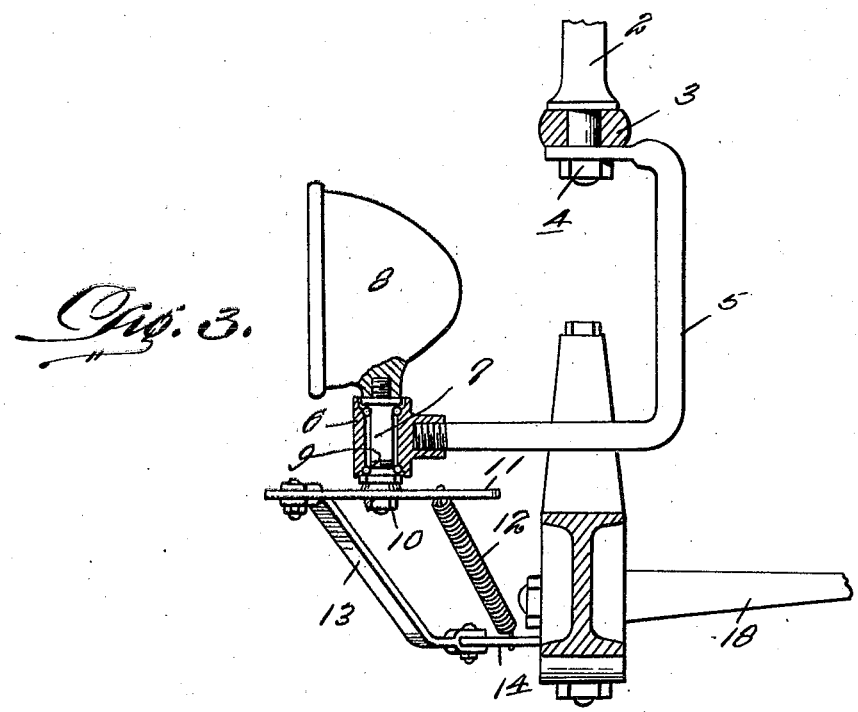
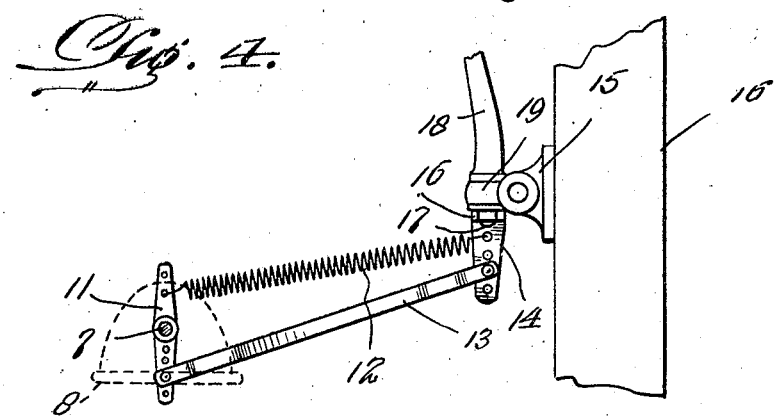

Patented Feb. 27, 1923.

1,446,979

UNITED STATES PATENT OFFICE.

WALTER W. McDOWELL, OF KIEFER, OKLAHOMA.

DIRIGIBLE HEADLIGHT CONSTRUCTION.

Application filed August 10, 1922. Serial No. 530,996.

*To all whom it may concern:*

Be it known that I, WALTER W. McDOWELL, a citizen of the United States, residing at Kiefer, in the county of Creek and State of Oklahoma, have invented new and useful Improvements in Dirigible Headlight Constructions, of which the following is a specification.

The object of my said invention is the provision of a reliable dirigible headlight construction embodying low lamps and means whereby the lamps will be swung correspondingly with the swinging of the front wheels in the making of a turn so as to illuminate the roadway in front of the car.

The novel low headlight construction is also adapted to be used in connection with the ordinary lamps of a well known make of automobile so that the roadway in front of the car will be illuminated by the comparatively high non-dirigible lamps as well as by the low dirigible lamps.

To the attainment of the foregoing, the invention consists in the improvement as hereinafter described and definitely claimed.

In the accompanying drawings, forming part of this specification:—

Figure 3 is an enlarged detail vertical section taken in the plane indicated by the line 3—3 of Figure 1.

Figure 4 is an enlarged detail horizontal section taken in the plane indicated by the line 4—4 of Figure 1.

Similar numerals of reference designate corresponding parts in all of the views of the drawings.

Figure 1:
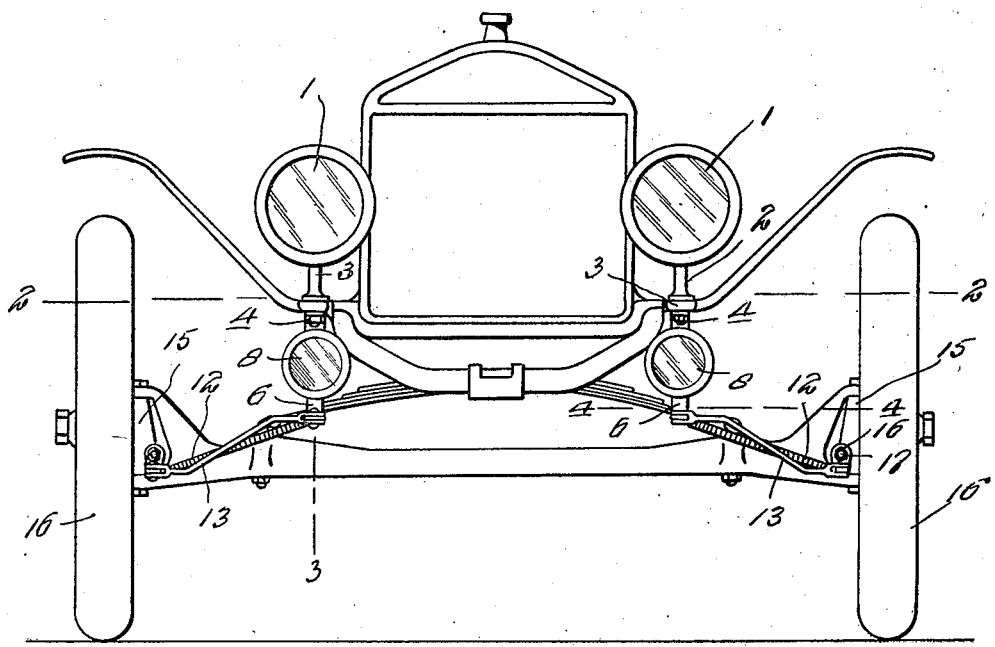
Figure 1 is a front elevation showing a portion of a well known make of automobile equipped with my improvement.
Figure 6:
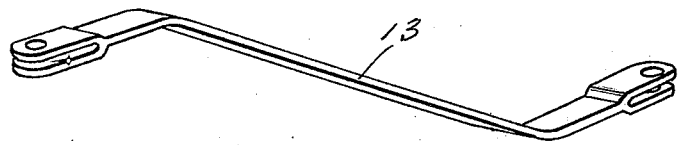
Figure 6 is an enlarged perspective of one of the links for interposition between the said arms and the T-heads on the spindles of the dirigible lamps.

The automobile illustrated is shown as provided with ordinary lamps 1 which in accordance with prevailing practice are supported by standards 2, the said standards being supported, in turn, by swells 3 on the fender brackets of the automobile and being provided with lower reduced portions which extend downwardly through said swells and are equipped with nuts 4.

In furtherance of my invention I employ in association with the standards 2 angular brackets 5 one of which is shown in detail in Figure 3. The said angular brackets 5 are equipped at their lower ends with vertically disposed sleeves 6, and in the said sleeves 6, are arranged the spindles 7 of dirigible lamps 8. Appropriate anti-friction bearings 9 for the spindles 7 are also arranged in the sleeves 6, and secured by nuts 10 on the lower ends of the spindles 7 or by any other appropriate means are T-heads 11. The said T-heads 11 are provided in their arms with apertures for adjustment purposes, and retractile springs 12 and links 13 are connected to the arms of the said T-heads. The said springs 12 and links 13 extend outwardly from the T-heads 11 and are connected to bracket arms 14 in which are sets of apertures for adjustment purposes. The said bracket arms 14 are fixed with respect to and extend forwardly from the knuckles 15 which carry the forward steering wheels 16 of the automobile. In the preferred embodiment of my invention and in order to facilitate the application of my improvement to automobiles such as at present in use the bracket arms 14 are provided with angularly-disposed and apertured heels 15, and the said heels 15 are secured by nuts 16 on the reduced portions 17 of steering arms 18 which steering arms are extended rearwardly from apertured portions 19 on the knuckles 15.

In virtue of my novel construction as shown and described it will be understood that the dirigible lamps 8 will be swung by and correspondingly with the swinging of the wheels 16 toward the right or toward the left incident to the steering of the automobile, and irrespective of the turn it will be manifest that the lamps 8 will illuminate the path of the automobile in the direction in which the turn is made, and being located near the ground, the said lamps 8 will thoroughly illuminate the road in the direction of the turn, and this while the stationary lamps 1 illuminate the roadway in front of the body of the automobile.

The retractile springs 12 comprised in my improvement are always under tension, and they have the effect of preventing rattling of the moving parts and assuring steadiness of motion when the dirigible lamps 8 are moved as stated by and with the steering wheels 16.

In addition to the practical advantages ascribed to my novel construction it will be understood that the construction is readily applicable to automobiles at present in use, and that the construction as a whole is well adapted to withstand the usage to which automobiles are ordinarily subjected.

Figure 2:
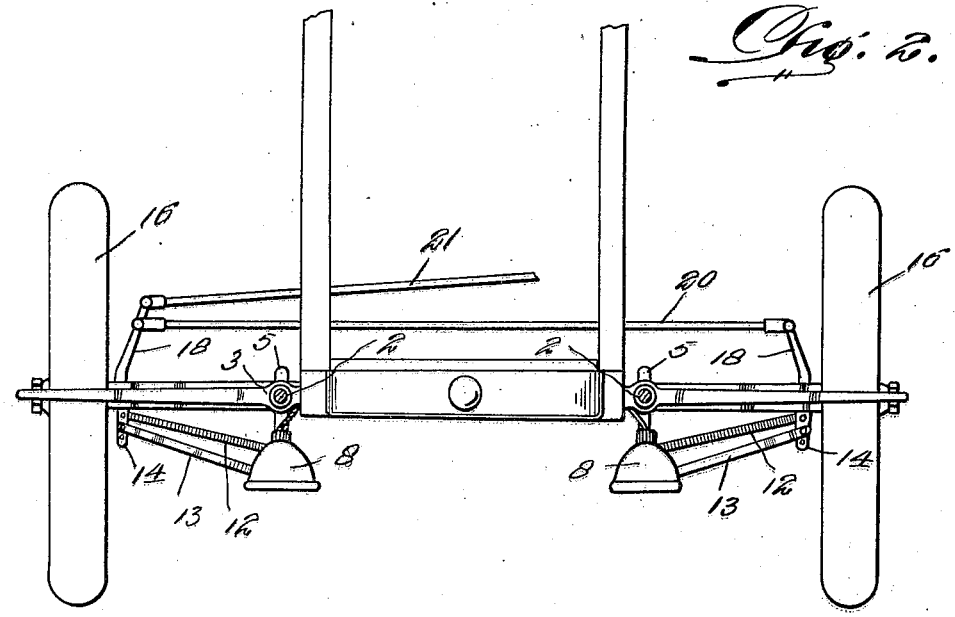
Figure 2 is a horizontal section taken in the plane indicated by the line 2—2 of Figure 1.
Figure 5:
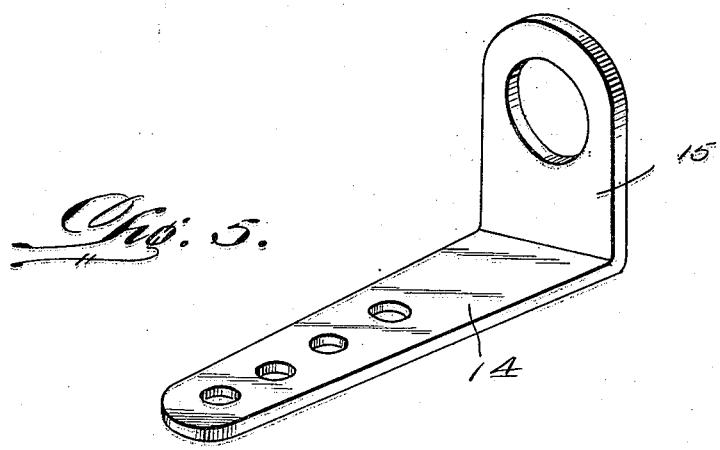
Figure 5 is an enlarged perspective of one of the arms which in accordance with my invention are connected to the steering knuckles of the automobile.

By particular reference to Figure 2 it will be noted that the rearwardly directed knuckle arms 18 are connected together in conventional manner by a cross rod 20, and that a rod 21 is connected to one of the knuckle arms 18, the said rod 21 being designed and adapted to be connected in the ordinary well known manner with the steering means of the automobile.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In a dirigible headlight construction for automobiles, the combination with apertured swells on fender brackets, knuckles carrying steering wheels and having inner apertured portions, steering arms having reduced portions extended through the apertured portions of the knuckles and equipped with nuts, and lamps having standards with reduced lower portions disposed in the swells of the fender brackets and equipped below said brackets with nuts; of brackets secured by said nuts on the forward reduced portions of the steering arms, angular brackets secured on the reduced portions of the standards of the lamps and provided at their lower forward ends with vertically disposed sleeves, dirigible lamps having pendent spindles disposed and adapted to turn in said sleeves, T-heads on said spindles and disposed below said sleeves, retractile tension springs interposed between and connecting the brackets on the steering arms and the T-heads, and links interposed between and connecting the brackets on the steering arms and the T-heads, the said springs and links having their inner ends disposed at opposite sides of the centers of the T-heads.

2. In a dirigible headlight construction, the combination of fender brackets, steering knuckles and wheels carried by said knuckles, brackets fixed to and extending forwardly from the inner portions of the knuckles, angular brackets fixed to and extending downwardly and then forwardly from the fender brackets and having sleeves at their forward ends, dirigible headlights having spindles journaled in said sleeves, T-heads fixed to the lower ends of said spindles, retractile springs interposed between and connected to the brackets and the T-heads; the inner ends of the springs and links being disposed at opposite sides of the centers of the T-head.

In testimony whereof I affix my signature.

WALTER W. McDOWELL.